(No Model.)

H. GILLMORE.
TUBE SCRAPER.

No. 452,938. Patented May 26, 1891.

Witnesses:
John Grist
A. A. Horsey.

Inventor:
Harmon Gillmore
By Henry Grist
Attorney.

UNITED STATES PATENT OFFICE.

HARMON GILLMORE, OF ST. WILLIAMS, CANADA, ASSIGNOR TO ARTHUR J. AKER, OF SAME PLACE, AND JOHN L. BUCK, ALONZO DENTON, EDWARD H. JEEVES, AND GEORGE B. KILLMASTER, ALL OF PORT ROWAN, CANADA.

TUBE-SCRAPER.

SPECIFICATION forming part of Letters Patent No. 452,938, dated May 26, 1891.

Application filed January 13, 1891. Serial No. 377,669. (No model.) Patented in Canada December 19, 1890, No. 35,641.

*To all whom it may concern:*

Be it known that I, HARMON GILLMORE, of St. Williams, in the county of Norfolk, in the Province of Ontario, in the Dominion of Canada, have invented certain new and useful Improvements in Tube-Scrapers, (for which I have obtained a patent in Canada, No. 35,641, dated December 19, 1890;) and I do hereby declare that the following is a full, clear, and exact description of the same, reference being had to the accompanying drawings, in which—

Figure 1:
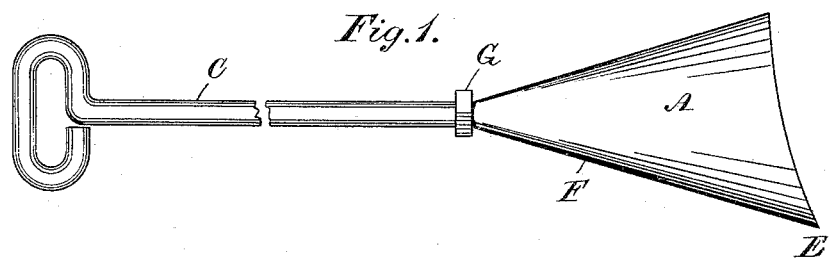
Figure 2:
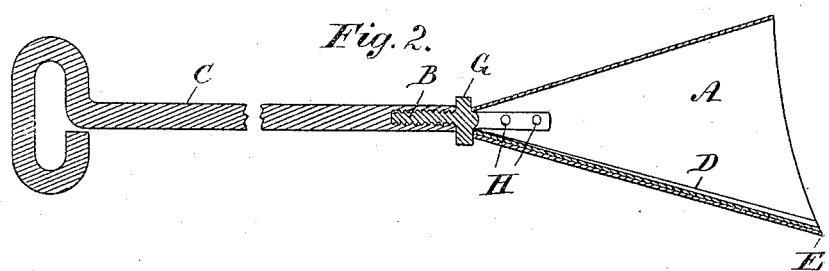
Figure 3:
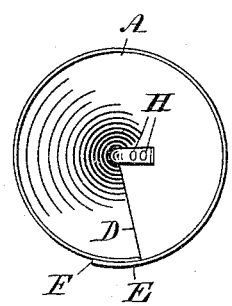

Figure 1 is a side elevation of my improved scraper. Fig. 2 is a longitudinal section of the same, and Fig. 3 is an end view.

My invention has for its object to provide a simple and efficient scraper which when forced by a handle through a tube shall conform to the entire internal circumference of said tube, and also fit tubes of various sizes for the detachment and removal of scale, dirt, and sooty accumulations at one operation.

My invention consists of an implement having a hollow conical head provided with free overlapping edges from the base to the apex and a handle attached in any suitable manner to the small end of the cone, whereby the cone will contract by pressure from without and preserve its form circumferentially.

A represents the head of the scraper, made of a piece of sheet-steel cut to proper shape and bent to form a hollow cone, the edges overlapping and free to move one over the other, whereby the larger end of the conical head can be diminished in diameter by circumferential compression, so as to preserve the circular configuration and fit different tubes of various sizes and expand within the tube to have contact with the internal circumference and have sufficient elasticity to expand and follow the tube internally to cut away scale or dislodge accumulations in the tube.

The blank of steel forming the conical head of the scraper is cut to shape to provide a projecting lip E at the larger end of the cone to rest on the tube internally prior to the scraper being thrust into the tube, so that by rotating the handle or turning the scraper in one direction the head A will contract, thereby causing the implement to have easy entrance into the tube. The smaller end of the conical head A of the scraper is attached to a screw-threaded shank B by rivets H, and said shank screws into the end of a tapped iron tube, which forms the handle C, or any other connection of the head to a suitable handle may be adopted. The shank B is attached to the head A, so as to leave both overlapping edges D F free to contract and expand circumferentially throughout the length of the head, whereby the diameter of the base will yield flexibly to suit various sizes of tubes, and the edges D F may be beveled to keep the circumference of the cone as nearly as possible a true circle.

If desired, the handle C may be attached directly to the head A, and said handle may be in jointed sections to admit of being lengthened or shortened to suit the length of the tube to be cleaned and for convenience of transportation. The shank B is preferably formed with a polygonal shoulder G to allow a wrench to be used in screwing the shank to the handle.

To clear a boiler-tube, the larger end of the head A is compressed to fit into the tube, as before described, and the conical head thrust through the tube by the handle. The circular edge of the head A will then by expansion have contact with the interior of the tube and cut away scaly matter and dislodge other accumulations, the cone gathering the material as the scraper progresses through the tube.

I claim as my invention—

A tube-scraper consisting of a piece of sheet-steel cut to shape and bent to form a hollow conical head A, having two free overlapping edges from base to apex, and a shank B, attached to the smaller end of said head, and a handle connected to said shank, as set forth.

HARMON GILLMORE.

Witnesses:
JOSEPH ROBINS,
FRANK REEVES.